US012717193B2

(12) United States Patent
Imai et al.

(10) Patent No.: US 12,717,193 B2
(45) Date of Patent: Aug. 25, 2026

(54) OPTICAL DEVICE

(71) Applicant: Japan Display Inc., Tokyo (JP)

(72) Inventors: Takayuki Imai, Tokyo (JP); Kojiro Ikeda, Tokyo (JP); Takeo Koito, Tokyo (JP)

(73) Assignee: Japan Display Inc., Tokyo (JP)

( * ) Notice: Subject to any disclaimer, the term of this patent is extended or adjusted under 35 U.S.C. 154(b) by 140 days.

(21) Appl. No.: 18/390,270

(22) Filed: Dec. 20, 2023

(65) Prior Publication Data

US 2024/0118575 A1 Apr. 11, 2024

Related U.S. Application Data

(63) Continuation of application No. PCT/JP2022/022991, filed on Jun. 7, 2022.

(30) Foreign Application Priority Data

Jun. 23, 2021 (JP) ................................. 2021-104191

(51) Int. Cl.
*G02F 1/1347* (2006.01)
*G02F 1/1343* (2006.01)
*G02F 1/1362* (2006.01)

(52) U.S. Cl.
CPC ...... *G02F 1/1347* (2013.01); *G02F 1/134309* (2013.01); *G02F 1/13439* (2013.01); *G02F 1/136286* (2013.01)

(58) Field of Classification Search
CPC ............. G02F 1/1347; G02F 1/134309; G02F 1/13439; G02F 1/136286
See application file for complete search history.

(56) References Cited

U.S. PATENT DOCUMENTS 11,035,552 B2 6/2021 Galstian et al.
2005/0078237 A1 4/2005 Klaus et al.
(Continued)

FOREIGN PATENT DOCUMENTS

JP S5823090 A 2/1983
JP 2008-158278 A 7/2008
(Continued)

OTHER PUBLICATIONS

English translation of Office Action issued in related Japanese Patent Application No. 2023-529806 on Jul. 23, 2024. 2 pages.
(Continued)

*Primary Examiner* — David Y Chung
(74) *Attorney, Agent, or Firm* — K&L Gates LLP

(57) ABSTRACT

An optical device includes an optical element including a liquid crystal cell configured to distribute light emitted from a light source, a power supply part configured to generate first and second potentials, a control signal generation circuit part configured to generate a control signal that controls a pulse width of each of the first and second potentials, and a switch circuit part configured to output a first potential signal including the first potential with a first pulse width and the second potential with a second pulse width based on the control signal. The liquid crystal cell includes a first substrate on which first and second transparent electrodes are alternately arranged in a first direction, and a second substrate on which third and fourth transparent electrodes are alternately arranged in a second direction. The first potential signal is input to the first transparent electrode.

9 Claims, 15 Drawing Sheets

(56) References Cited

U.S. PATENT DOCUMENTS

| | | | |
|---|---|---|---|
| 2005/0243237 A1 | 11/2005 | Sasuga | |
| 2010/0149444 A1 | 6/2010 | Hikmet et al. | |
| 2014/0104545 A1 | 4/2014 | Miyazawa et al. | |
| 2018/0196318 A1* | 7/2018 | Presniakov | G02F 1/134363 |
| 2020/0041852 A1* | 2/2020 | Hikmet | G02F 1/134363 |
| 2020/0110297 A1* | 4/2020 | Takahashi | G02F 1/1345 |
| 2022/0206347 A1 | 6/2022 | Mitsui et al. | |

FOREIGN PATENT DOCUMENTS

| | | |
|---|---|---|
| JP | 2010230887 A | 10/2010 |
| JP | 2018045187 A | 3/2018 |
| JP | 2021-051187 A | 4/2021 |
| WO | 2015/136458 A1 | 9/2015 |

OTHER PUBLICATIONS

English translation of Office Action issued in related Korean Patent Application No. 10-2023-7043097 on Dec. 17, 2024. 11 pages.

Canadian Office Action from corresponding Canadian Patent Application No. 3,222,617, dated Apr. 4, 2025. 3 pages.

International Search Report issued in International Patent Application No. PCT/JP2022/022991, dated Aug. 2, 2022 and English Translation of same. 7 pages.

Written Opinion issued in International Patent Application No. PCT/JP2022/022991, dated Aug. 2, 2022. 4 pages.

Extended European Search Report issued in related European Patent Application No. 22828215.8, dated May 19, 2025. 9 pages.

English translation of Office Action issued in related Japanese Patent Application No. 2025-005523 dated Sep. 2, 2025. 3 pages.

English machine translation of Office Action dated Jan. 15, 2026 issued in Brazilian Appl. No. 1120230262070. 7 pages.

Office Action dated Mar. 11, 2026 issued in related Indian Patent Application No. 202317086850 with English translation. 9 pages.

English machine translation of Office Action dated Apr. 27, 2026 issued in MX Appl. No. MX/a/2023/01562. 3 pages.

English machine translation of Office Action dated May 11, 2026 issued in CN Appl. No. 202280042096.0. 10 pages.

* cited by examiner

10

120-8
110-4
150-4
160-4
130-15
140-4
130-13
130-14
140-7
120-7
170-3
120-6
110-3
150-3
160-3
130-11
140-6
130-9
130-10
140-5
120-5
170-2
120-4
110-2
150-2
160-2
130-7
140-4
130-5
130-6
140-3
120-3
170-1
120-2
110-1
150-1
160-1
130-3
140-2
130-1
130-2
140-1
120-1

10

120-8
110-4
150-4
160-4
140-8
130-15
130-16
140-7
130-13
120-7
170-3
120-6
110-3
150-3
160-3
140-6
130-11
130-12
140-5
130-9
120-5
170-2
120-4
110-2
150-2
160-2
140-4
130-7
130-8
140-3
130-5
120-3
170-1
120-2
110-1
150-1
160-1
140-2
130-3
130-4
140-1
130-1
120-1

OPTICAL DEVICE

CROSS-REFERENCE TO RELATED APPLICATIONS

This application is a Continuation of International Patent Application No. PCT/JP2022/022991, filed on Jun. 7, 2022, which claims the benefit of priority to Japanese Patent Application No. 2021-104191, filed on Jun. 23, 2021, the entire contents of which are incorporated herein by reference.

FIELD

An embodiment of the present invention relates to an optical device, in particular, an optical device using liquid crystal.

BACKGROUND

An optical element which is a so-called liquid crystal lens has been conventionally known in which a change in the refractive index of a liquid crystal is utilized by adjusting a voltage applied to the liquid crystal (for example, see Japanese laid-open patent publication No. 2005-317879, 2010-230887, or 2014-160277). For example, the lighting devices disclosed in the Japanese laid-open patent publications Nos. 2005-317879 and 2010-230877 use a liquid crystal lens to distribute light from a light source in a circular shape. Further, the beam shaping device disclosed in the Japanese laid-open patent publication No. 2014-160277 changes the distribution shape of light by changing patterns of an electrode applied to a liquid crystal.

SUMMARY

An optical device according to an embodiment of the present invention includes an optical element including at least one liquid crystal cell configured to distribute light emitted from a light source, a power supply part configured to generate a first potential and a second potential different from the first potential, a control signal generation circuit part configured to generate a control signal that controls a first pulse width of the first potential and a second pulse width of the second potential, and a switch circuit part configured to output a first potential signal including the first potential with the first pulse width and the second potential with the second pulse width based on the control signal. The at least one liquid crystal cell includes a first substrate on which a first transparent electrode and a second transparent electrode are alternately arranged in a first direction, and a second substrate on which a third transparent electrode and a fourth transparent electrode are alternately arranged in a second direction intersecting the first direction. The first potential signal is input to the first transparent electrode.

Further, an optical device according to an embodiment of the present invention includes an optical element comprising at least one liquid crystal cell configured to distribute light emitted from a light source, a power supply part including a first power source configured to generate a first potential and a second power source configured to generate a second potential different from the first potential, a control signal generation circuit part configured to generate a first control signal, a second control signal, a third control signal, and a fourth control signal that control a first pulse width of the first potential and a second pulse width of the second potential, and a switch circuit part including a first switch circuit, a second switch circuit, a third switch circuit, and a fourth switch circuit. Each of the first switch circuit, the second switch circuit, the third switch circuit, and the fourth switch circuit electrically connected to the first power source and the second power source. The first switch circuit outputs a first potential signal based on the first control signal, the second switch circuit outputs a second potential signal based on the second control signal, the third switch circuit outputs a third potential signal based on the third control signal, and the fourth switch circuit outputs a fourth potential signal based on the fourth control signal. The at least one liquid crystal cell includes a first substrate on which a first transparent electrode and a second transparent electrode are alternately arranged in a first direction, and a second substrate on which a third transparent electrode and a fourth transparent electrode are alternately arranged in a second direction intersecting the first direction. The first transparent electrode, the second transparent electrode, the third transparent electrode, and the fourth transparent electrode are electrically connected to the first switch circuit, the second switch circuit, the third switch circuit, and the fourth switch circuit, respectively. The first potential signal, the second potential signal, the third potential signal, and the fourth potential signal are input to the first transparent electrode, the second transparent electrode, the third transparent electrode, and the fourth transparent electrode, respectively.

DESCRIPTION OF EMBODIMENTS

Figure 1A:
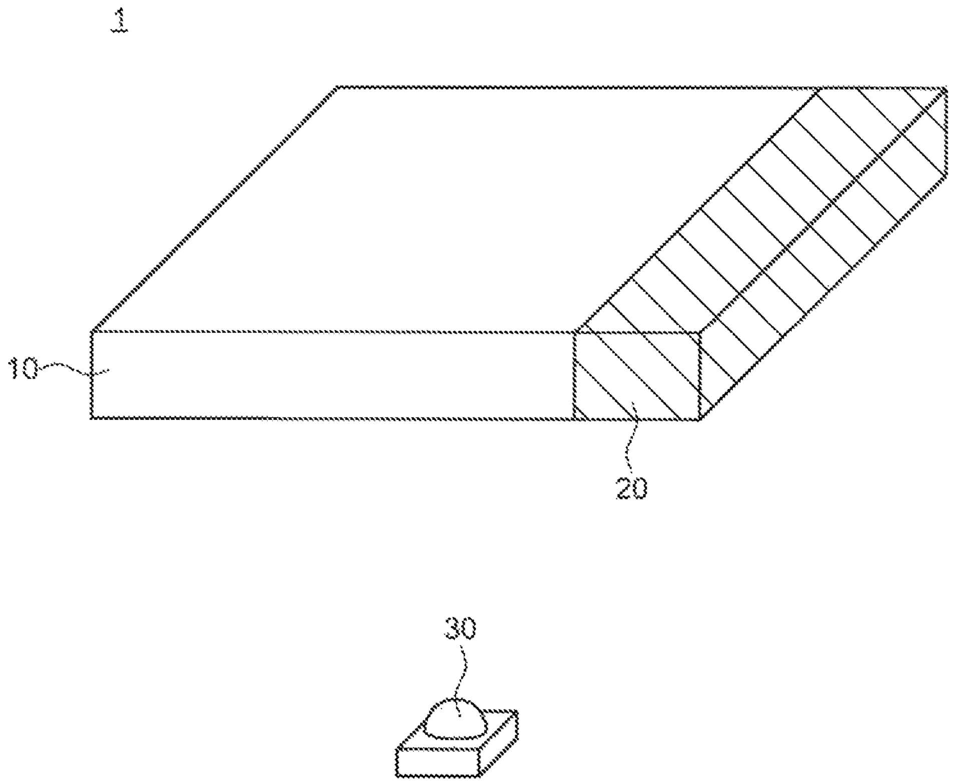
FIG. 1A is a schematic perspective view of an optical device according to an embodiment of the present invention.

In an optical device using a liquid crystal, a light distribution may be controlled by changing the magnitude of a voltage applied to the liquid crystal. In this case, the optical device requires the inclusion of a digital-to-analog conversion circuit (DAC) or an amplification circuit (AMP), which complicates control of a light distribution and causes an increase in manufacturing costs.

In view of the above problem, an embodiment of the present invention can provide an optical device with reduced manufacturing costs.

Hereinafter, each of the embodiments of the present invention is described with reference to the drawings. However, the present invention can be implemented in various modes without departing from the gist of the invention and should not be interpreted as being limited to the description of the embodiments exemplified below.

Although the drawings may be schematically represented in terms of width, thickness, shape, and the like of each part as compared with their actual mode in order to make explanation clearer, they are only an example and an interpretation of the present invention is not limited. In addition, in the drawings, the same reference numerals are provided to the same elements as those described previously with reference to preceding figures and repeated explanations may be omitted accordingly.

In the case when a single film is processed to form a plurality of structural bodies, each structural body may have different functions and roles, and the bases formed beneath each structural body may also be different. However, the plurality of structural bodies is derived from films formed in the same layer by the same process and have the same material. Therefore, the plurality of these films is defined as existing in the same layer.

When expressing a mode in which another structure is arranged over a certain structure, in the case where it is simply described as "over", unless otherwise noted, a case where another structure is arranged directly over a certain structure as if in contact with that structure, and a case where another structure is arranged via another structure over a certain structure, are both included.

An optical device 1 according to an embodiment of the present invention is described with reference to FIGS. 1A to 11. First, a configuration of the optical device 1 is described with reference to FIGS. 1A and 1B.

[1. Configuration of Optical Device 1]

Figure 1B:
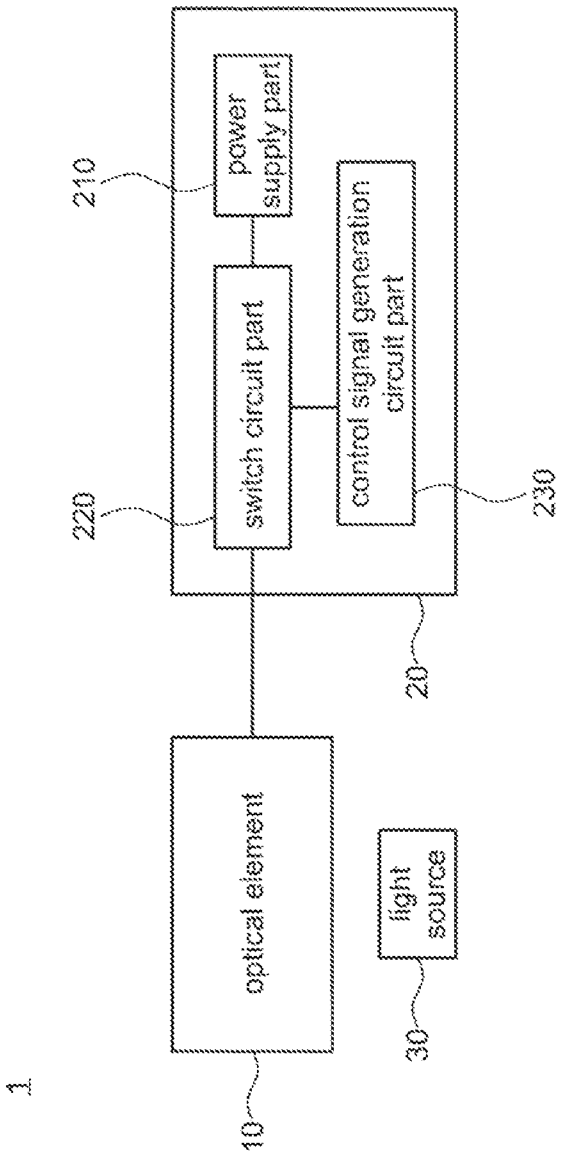
FIG. 1B is a diagram illustrating an optical device according to an embodiment of the present invention.

FIG. 1A is a schematic perspective view of the optical device 1 according to an embodiment of the present invention. Further, FIG. 1B is a block diagram illustrating the optical device 1 according to an embodiment of the present invention. As shown in FIG. 1A, the optical device 1 includes an optical element and a control unit 20 that controls the optical element 10. Further, the optical device 1 may include not only the optical element 10 and the control unit 20 but also a light source 30 that irradiates the optical element 10 with light. The light emitted from the light source 30 passes through the optical element 10 and is emitted. The control unit 20 controls the optical element 10 to diffuse or converge the light passing through the optical element 10. That is, the optical device 1 can control a light distribution.

As shown in FIG. 1B, the control unit 20 includes a power supply part 210, a switch circuit part 220, and a control signal generation circuit part 230. The optical element 10 is connected to a switch circuit part 220. Further, the switch circuit part 220 is connected to the power supply part 210. That is, the optical element 10 is connected to the power supply part 210 via the switch circuit part 220.

The power supply part 210 includes a power source that generates a predetermined potential. For example, although the power supply part 210 may include two power sources that generate two potentials, the power supply part 210 is not limited thereto. Further, the power supply part 210 may include a potential that is GND (e.g., 0 V). In addition, for convenience of explanation, even in the case of GND, it may be described as a power source that generates a potential in the present specification.

The control signal generation circuit part 230 generates a control signal to control the switch circuit part 220. A plurality of control signals for controlling the switch circuit part 220 may be generated. A switch circuit included in the switch circuit part 220 is a so-called analog switch. That is, the switch circuit part 220 can control the supply of the potential generated by the power supply part 210 to the optical element 10 based on the control signal from the control signal generation circuit part 230. In the optical device 1, since the supply of the potential generated by the power supply part 210 is directly controlled using the switch circuit part 220, the optical device 1 does not require a DAC or an AMP.

The control signal generation circuit part 230 is a computer that can perform arithmetic processing using data or information. The control signal generation circuit part 230 includes, for example, a central processing unit (CPU), a micro processing unit (MPU), a graphic processing unit (GPU), a field programmable gate array (FPGA), a random access memory (RAM), or a dynamic random access memory (DRAM). The control signal generation circuit part 230 can generate a control signal according to predetermined information (pulse width or duty ratio, etc.).

Next, a configuration of the optical element 10 is described with reference to FIGS. 2 to 3B.

[2. Configuration of Optical Element 10]

Figure 2:
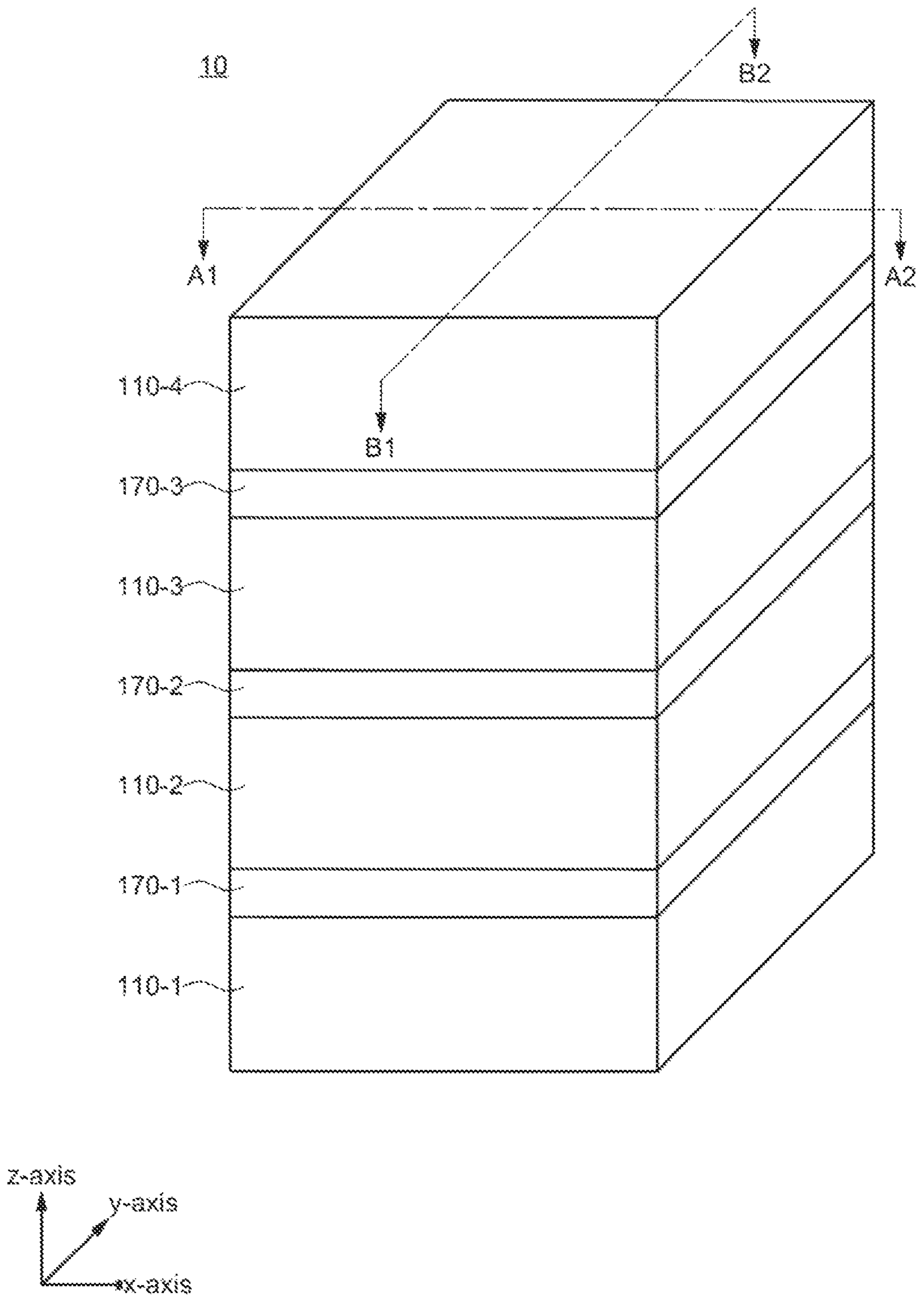
FIG. 2 is a schematic perspective view of an optical element of an optical device according to an embodiment of the present invention.

FIG. 2 is a schematic perspective view of the optical element 10 of the optical device 1 according to an embodiment of the present invention. As shown in FIG. 2, the optical element 10 includes a first liquid crystal cell 110-1, a second liquid crystal cell 110-2, a third liquid crystal cell 110-3, and a fourth liquid crystal cell 110-4. The first liquid crystal cell 110-1, the second liquid crystal cell 110-2, the third liquid crystal cell 110-3, and the fourth liquid crystal cell 110-4 are stacked in a z-axis direction. The second liquid crystal cell 110-2 is provided on the first liquid crystal cell 110-1. The third liquid crystal cell 110-3 is provided on the second liquid crystal cell 110-2. The fourth liquid crystal cell 110-4 is provided on the third liquid crystal cell 110-3. Although not shown in the figures, a light source is placed below the first liquid crystal cell 110-1. Therefore, light emitted from the light source 30 passes through the first liquid crystal cell 110-1, the second liquid crystal cell 110-2, the third liquid crystal cell 110-3, and the fourth liquid crystal cell 110-4 in this order.

The first optical elastic resin layer 170-1 adheres and fixes the first liquid crystal cell 110-1 and the second liquid crystal cell 110-2. The second optical elastic resin layer 170-2 adheres and fixes the second liquid crystal cell 110-2 and the third liquid crystal cell 110-3. The third optical elastic resin layer 170-3 adheres and fixes the third liquid crystal cell 110-3 and the fourth liquid crystal cell 110-4. An adhesive including a transparent acrylic resin or epoxy resin can be used as each of the first optical elastic resin layer 170-1, the second optical elastic resin layer 170-2, and the third optical elastic resin layer 170-3.

Figure 3A:
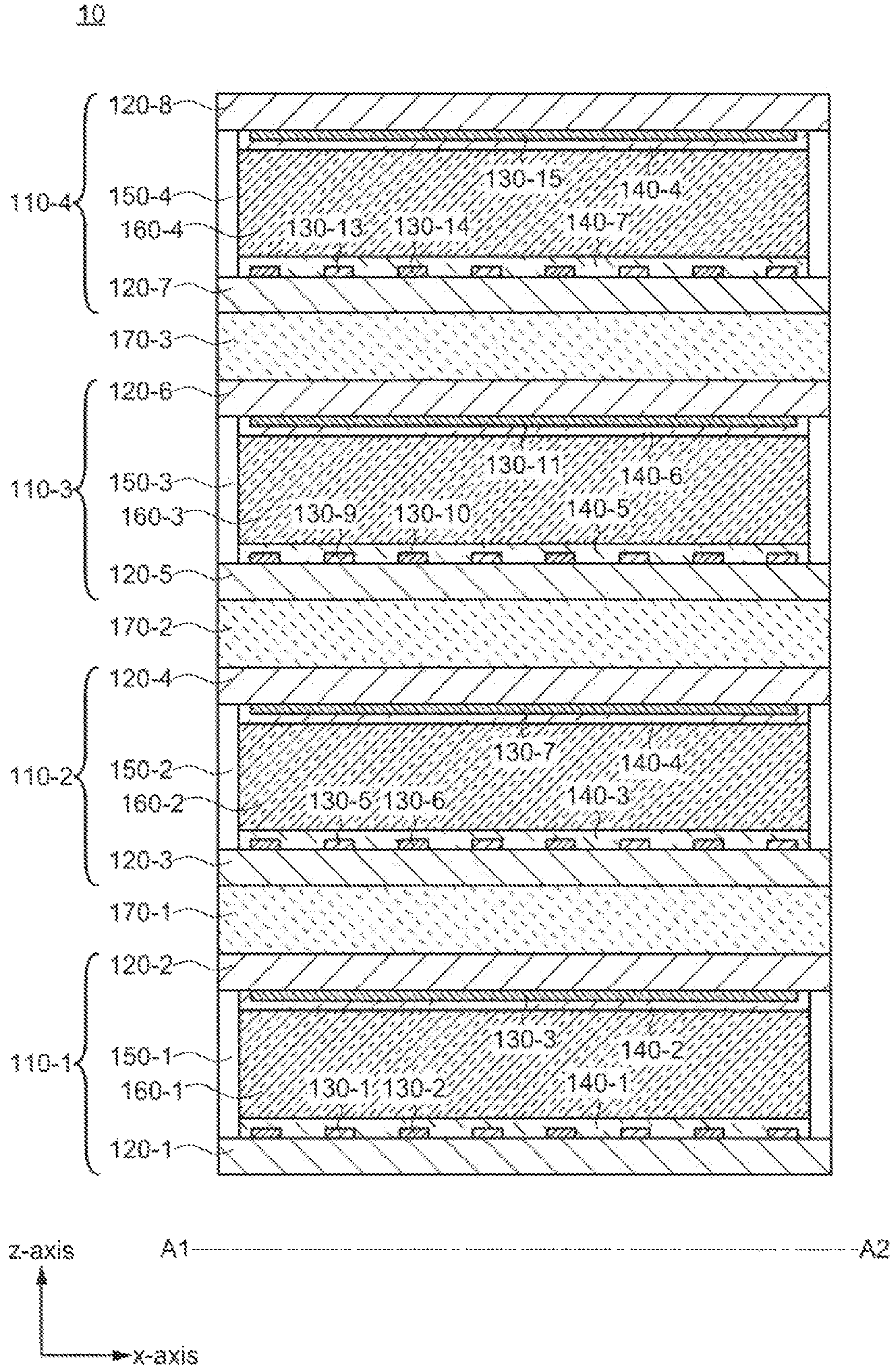
FIG. 3A is a schematic cross-sectional view of an optical element of an optical device according to an embodiment of the present invention.
Figure 3B:
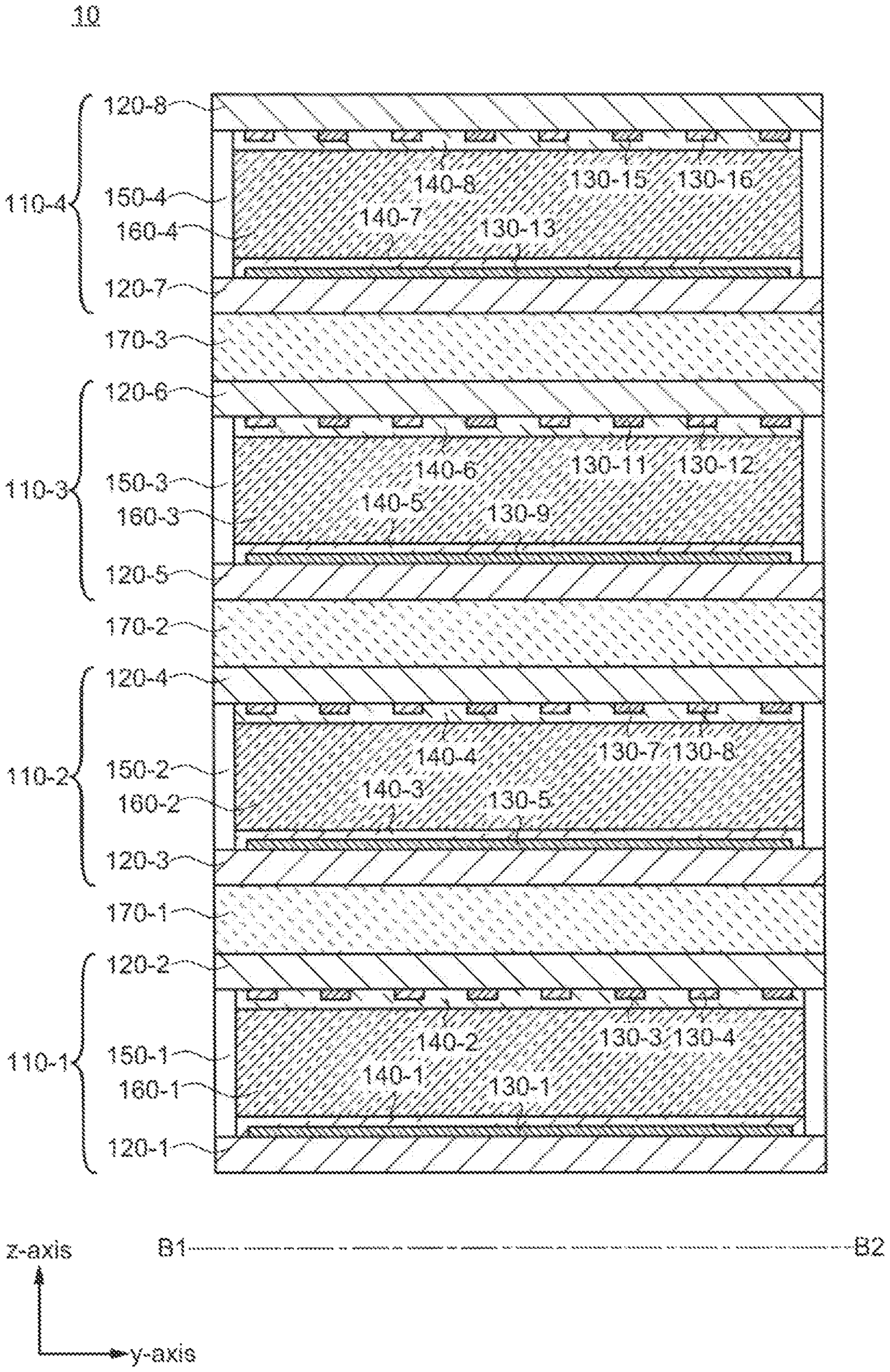
FIG. 3B is a schematic cross-sectional view of an optical element of an optical device according to an embodiment of the present invention.

FIGS. 3A and 3B are schematic cross-sectional views of the optical element 10 of the optical device 1 according to an embodiment of the present invention. Specifically, FIG. 3A is a schematic cross-sectional view in a zx plane cut along a line A1-A2 shown in FIG. 2, and FIG. 3B is a schematic cross-sectional view in a yz plane cut along a line B1-B2 shown in FIG. 2. In addition, hereinafter, an x-axis direction and a y-axis direction may be described as a first direction and a second direction, respectively.

The first liquid crystal cell 110-1 includes a first substrate 120-1 on which a first transparent electrode 130-1 and a second transparent electrode 130-2 are formed and a second substrate 120-2 on which a third transparent electrode 130-3 and a fourth transparent electrode 130-4 are formed. A first alignment film 140-1 is formed over the first substrate 120-1 in order to cover the first transparent electrode 130-1 and the second transparent electrode 130-2. Further, a second alignment film 140-2 is formed over the second substrate 120-2 in order to cover the third transparent electrode 130-3 and the fourth transparent electrode 130-4. The first substrate 120-1 and the second substrate 120-2 are arranged so that the first transparent electrode 130-1 and the second transparent electrode 130-2 on the first substrate 120-1 and the third transparent electrode 130-3 and the fourth transparent electrode 130-4 on the second substrate 120-2 face each other in a crosswise manner (hereinafter, the same configuration is applied). Further, a first sealing member 150-1 is formed around each of the first substrate 120-1 and the second substrate 120-2. That is, the first substrate 120-1 and the second substrate 120-2 are bonded to each other via the first sealing member 150-1. Further, a liquid crystal is sealed in a space surrounded by the first substrate 120-1 (more specifically, the first alignment film 140-1), the second substrate 120-2 (more specifically, the second alignment film 140-2), and the first sealing member 150-1 to form a first liquid crystal layer 160-1.

The second liquid crystal cell 110-2 includes a third substrate 120-3 on which a fifth transparent electrode 130-5 and a sixth transparent electrode 130-6 are formed and a fourth substrate 120-4 on which a seventh transparent electrode 130-7 and an eighth transparent electrode 130-8 are formed. A third alignment film 140-3 is formed on the third substrate 120-3 in order to cover the fifth transparent electrode 130-5 and the sixth transparent electrode 130-6. Further, a fourth alignment film 140-4 is formed on the fourth substrate 120-4 in order to cover the seventh transparent electrode 130-7 and the eighth transparent electrode 130-8. The third substrate 120-3 and the fourth substrate 120-4 are arranged so that the fifth transparent electrode 130-5 and the sixth transparent electrode 130-6 on the third substrate 120-3 and the seventh transparent electrode 130-7 and the eighth transparent electrode 130-8 on the fourth substrate 120-4 face each other. Further, a second sealing member 150-2 is formed around each of the third substrate 120-3 and the fourth substrate 120-4. That is, the third substrate 120-3 and the fourth substrate 120-4 are bonded to each other via the second sealing member 150-2. Further, a liquid crystal is sealed in a space surrounded by the third substrate 120-3 (more specifically, the third alignment film 140-3), the fourth substrate 120-4 (more specifically, the fourth alignment film 140-4), and the second sealing member 150-2 to form a second liquid crystal layer 160-2.

The third liquid crystal cell 110-3 includes a fifth substrate 120-5 on which a ninth transparent electrode 130-9 and a tenth transparent electrode 130-10 are formed and a sixth substrate 120-6 on which an eleventh transparent electrode 130-11 and a twelfth transparent electrode 130-12 are formed. A fifth alignment film 140-5 is formed on the fifth substrate 120-5 in order to cover the ninth transparent electrode 130-9 and the tenth transparent electrode 130-10. Further, a sixth alignment film 140-6 is formed on the sixth substrate 120-6 in order to cover the eleventh transparent electrode 130-11 and the twelfth transparent electrode 130-12. The fifth substrate 120-5 and the sixth substrate 120-6 are arranged so that the ninth transparent electrode 130-9 and the tenth transparent electrode 130-10 on the fifth substrate 120-5 and the eleventh transparent electrode 130-11 and the twelfth transparent electrode 130-12 on the sixth substrate 120-6 face each other. Further, a third sealing member 150-3 is formed around each of the fifth substrate 120-5 and the sixth substrate 120-6. That is, the fifth substrate 120-5 and the sixth substrate 120-6 are bonded to each other via the third sealing member 150-3. Further, a liquid crystal is sealed in a space surrounded by the fifth substrate 120-5 (more specifically, the fifth alignment film 140-5), the sixth substrate 120-6 (more specifically, the sixth alignment film 140-6), and the third sealing member 150-3 to form a third liquid crystal layer 160-3.

The fourth liquid crystal cell 110-4 includes a seventh substrate 120-7 on which a thirteenth transparent electrode 130-13 and a fourteenth transparent electrode 130-14 are formed and an eighth substrate 120-8 on which a fifteenth transparent electrode 130-15 and a sixteenth transparent electrode 130-16 are formed. A seventh alignment film 140-7 is formed on the seventh substrate 120-7 in order to cover the thirteenth transparent electrode 130-13 and the fourteenth transparent electrode 130-14. Further, an eighth alignment film 140-8 is formed on the eighth substrate 120-8 in order to cover the fifteenth transparent electrode 130-15 and the sixteenth transparent electrode 130-16. The seventh substrate 120-7 and the eighth substrate 120-8 are arranged so that the thirteenth transparent electrode 130-13 and the fourteenth transparent electrode 130-14 on the seventh substrate 120-7 and the fifteenth transparent electrode 130-15 and the sixteenth transparent electrode 130-16 on the eighth substrate 120-8 face each other. Further, a fourth sealing member 150-4 is formed around each of the seventh substrate 120-7 and the eighth substrate 120-8. That is, the seventh substrate 120-7 and the eighth substrate 120-8 are bonded to each other via the fourth sealing member 150-4. Further, a liquid crystal is sealed in a space surrounded by the seventh substrate 120-7 (more specifically, the seventh alignment film 140-7), the eighth substrate 120-8 (more specifically, the eighth alignment film 140-8), and the fourth sealing member 150-4 to form a fourth liquid crystal layer 160-4.

The first liquid crystal cell 110-1, the second liquid crystal cell 110-2, the third liquid crystal cell 110-3, and the fourth liquid crystal cell 110-4 have the same basic configuration.

Therefore, in the following description, an arrangement of the transparent electrodes 130 of the first liquid crystal cell 110-1 is described, and the description of an arrangement of the transparent electrodes 130 of the second liquid crystal cell 110-2, the third liquid crystal cell 110-3, and the fourth liquid crystal cell 110-4 is omitted.

In the first liquid crystal cell 110-1, the first transparent electrode 130-1 and the second transparent electrode 130-2 extend in the y-axis direction, and the third transparent electrode 130-3 and the fourth transparent electrode 130-4 extend in the x-axis direction. Further, the first transparent electrode 130-1 and the second transparent electrode 130-2 are arranged alternately in a comb-teeth shape in the x-axis direction, and the third transparent electrode 130-3 and the fourth transparent electrode 130-4 are alternately arranged in a comb-teeth shape in the y-axis direction. In a plan view, although the extending direction (y-axis direction) of the first transparent electrode 130-1 and the second transparent electrode 130-2 is orthogonal to the extending direction (x-axis direction) of the third transparent electrode 130-3 and the fourth transparent electrode 130-4, they may intersect each other with a slight shift from the orthogonal direction.

In the plan view, the first transparent electrode 130-1 of the first liquid crystal cell 110-1, the fifth transparent electrode 130-5 of the second liquid crystal cell 110-2, the ninth transparent electrode 130-9 of the third liquid crystal cell 110-3, and the thirteenth transparent electrode 130-13 of the fourth liquid crystal cell 110-4 overlap each other so that their extending directions (y-axis direction) substantially match each other. However, the first liquid crystal cell 110-1 to the fourth liquid crystal cell 110-4 may be arranged so that the first transparent electrode 130-1, the fifth transparent electrode 130-5, the nineth transparent electrode 130-9, and the thirteenth transparent electrode 130-13 overlap each other with a slight shift.

For example, a rigid substrate having light-transmitting properties such as a glass substrate, a quartz substrate, or a sapphire substrate is used as each of the first substrate 120-1 to the eighth substrate 120-8. Further, a flexible substrate having light-transmitting properties such as a polyimide resin substrate, an acrylic resin substrate, a siloxane resin substrate, or a fluorine resin substrate can also be used as each of the first substrate 120-1 to the eighth substrate 120-8.

Each of the first transparent electrode 130-1 to the sixteenth transparent electrode 130-16 functions as an electrode for forming an electric field in the liquid crystal layer 160. For example, a transparent conductive material such as indium tin oxide (ITO) or indium zinc oxide (IZO) is used for each of the first transparent electrode 130-1 to the sixteenth transparent electrode 130-16.

Each of the first liquid crystal layer 160-1 to the fourth liquid crystal layer 160-4 can refract transmitted light or change the polarization state of transmitted light according to the alignment state of the liquid crystal molecules. For example, nematic liquid crystal can be used as the liquid crystal of each of the first liquid crystal layer 160-1 to the fourth liquid crystal layer 160-4. Although a positive liquid crystal is adopted in the embodiment, it is also possible to adopt a configuration of a negative liquid crystal by changing the initial alignment direction of the liquid crystal molecules. Further, the liquid crystal preferably contains a chiral agent that imparts twist to the liquid crystal molecules.

Each of the first alignment film 140-1 to the eighth alignment film 140-8 aligns the liquid crystal molecules in the liquid crystal layer 113 in a predetermined direction. For example, a polyimide resin or the like can be used for each of the first alignment film 140-1 to the eighth alignment film 140-8. In addition, each of the first alignment film 140-1 to the eighth alignment film 114-2 may be imparted with alignment properties by an alignment treatment such as a rubbing method or a photo-alignment method. The rubbing method is a method of rubbing the surface of the alignment film in one direction. The photo-alignment method is a method of irradiating an alignment film with linearly polarized ultraviolet rays.

An adhesive material containing epoxy resin, acrylic resin, or the like can be used for the first sealing member 150-1 to the fourth sealing member 150-4. The adhesive material may be of an ultraviolet curable type or a heat curable type.

The optical element 10 includes at least two liquid crystal cells (for example, the first liquid crystal cell 110-1 and the second liquid crystal cell 110-2), so that the light distribution of unpolarized light can be controlled. Therefore, it is not necessary to provide a pair of polarizing plates on the outer surface of each of the first substrate 120-1 of the first liquid crystal cell 110-1 and the eighth substrate 120-8 of the fourth liquid crystal cell 110-4.

[3. Control of Light Distribution by Optical Element 10]

Figure 4A:
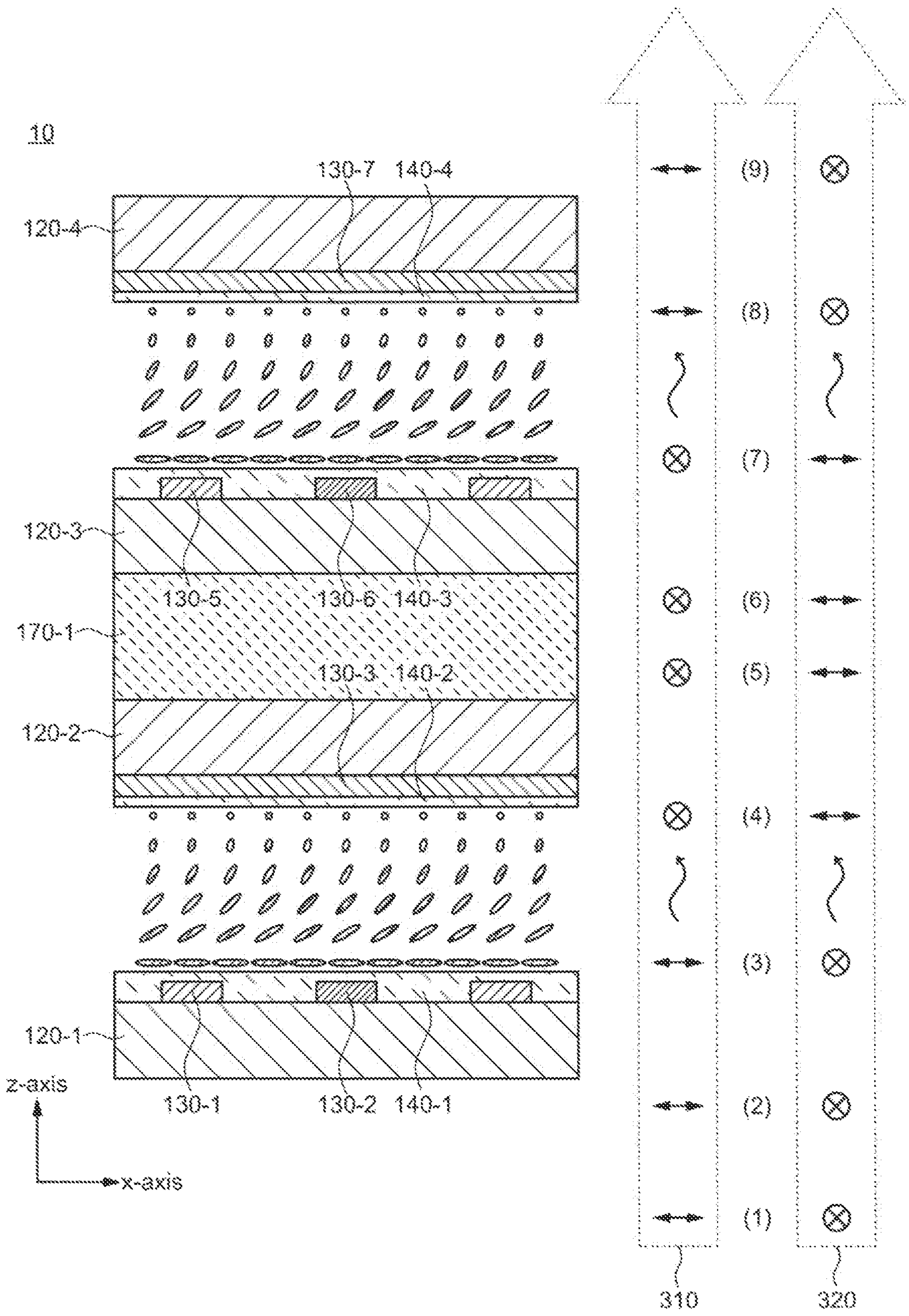
FIG. 4A is a schematic cross-sectional view illustrating control of a light distribution by an optical element of an optical device according to an embodiment of the present invention.
Figure 4B:
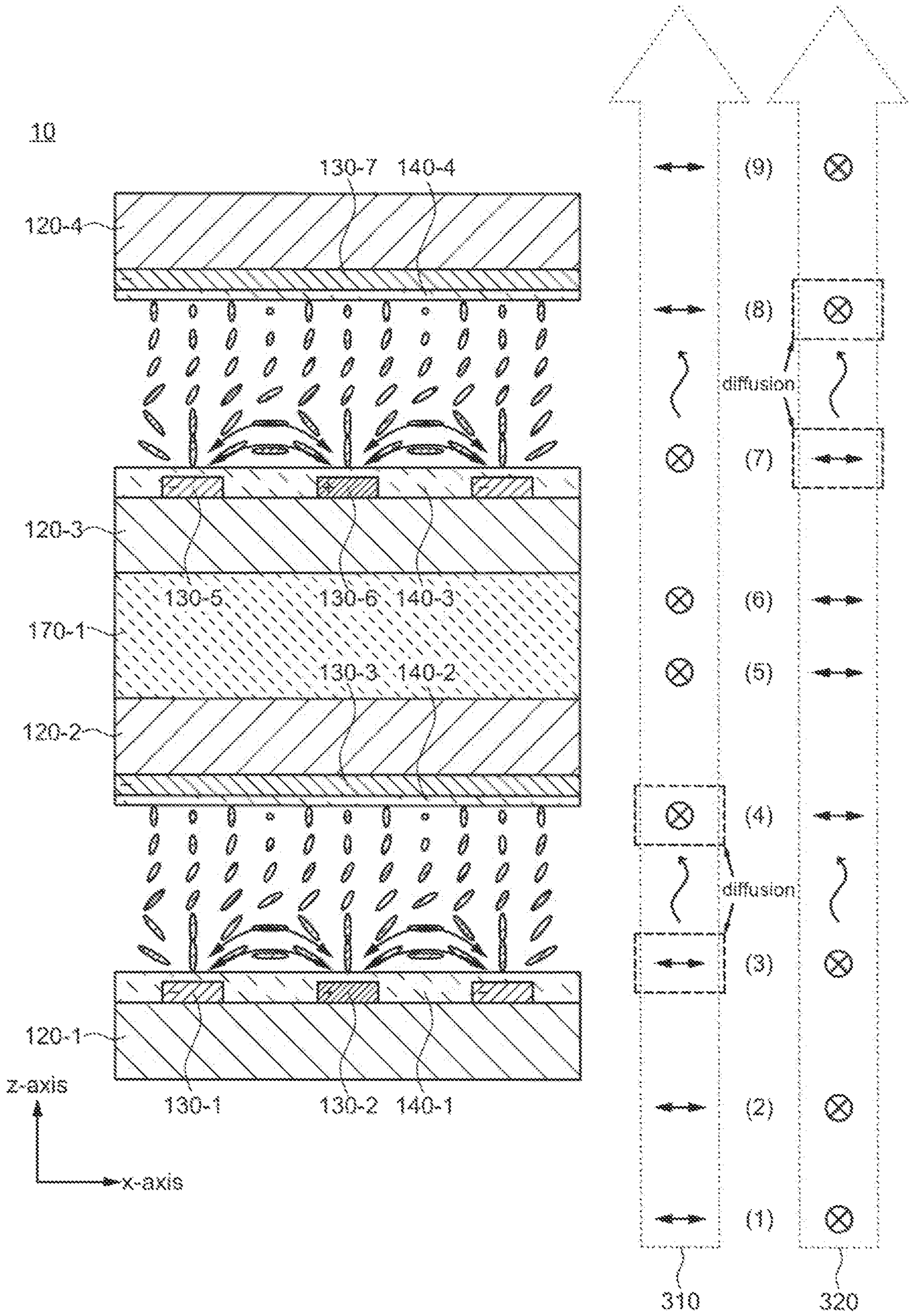
FIG. 4B is a schematic cross-sectional view illustrating control of a light distribution by an optical element of an optical device according to an embodiment of the present invention.

FIGS. 4A and 4B are schematic cross-sectional views illustrating the control of a light distribution by the optical element 10 of the optical device 1 according to an embodiment of the present invention. FIGS. 4A and 4B show a part of a cross-sectional view of the first liquid crystal cell 110-1 and the second liquid crystal cell 110-2 shown in FIG. 3A. FIG. 4A shows the optical element 10 in a state where no potential is supplied to the transparent electrodes 130, and FIG. 4B shows the optical element 10 in a state where the transparent electrodes 130 are supplied with a potential. In addition, the control of supply of potentials to the transparent electrodes 130 is described later.

The alignment treatment in the x-axis direction is performed on the first alignment film 140-1. Thus, as shown in FIG. 4A, the long axes of the liquid crystal molecules on the side of the first substrate 120-1 in the first liquid crystal layer 160-1 are aligned along the x-axis direction. That is, the alignment direction of the liquid crystal molecules on the side of the first substrate 120-1 is orthogonal to the extending direction (y-axis direction) of the first transparent electrode 130-1 and the second transparent electrode 130-2. Further, the alignment treatment in the y-axis direction is performed on the second alignment film 140-2. Thus, as shown in FIG. 3A, the long axes of the liquid crystal molecules on the side of the second substrate 120-2 in the first liquid crystal layer 160-1 are aligned along the y-axis direction. That is, the alignment direction of the liquid crystal molecules on the side of the second substrate 120-2 is orthogonal to the extending direction (x-axis direction) of the third transparent electrode 130-3 and the fourth transparent electrode 130-4. Therefore, the direction of the long axes of the liquid crystal molecules in the first liquid crystal layer 160-1 gradually change from the x-axis direction to the y-axis direction moving from the first substrate 120-1 to the second substrate 120-2, and are aligned in a state twisted by 90 degrees.

Since the liquid crystal molecules in the second liquid crystal layer 160-2 are also similar to the liquid crystal molecules in the first liquid crystal layer 160-1, the description thereof is omitted here.

When potentials are supplied to the transparent electrodes 130, the alignment of the liquid crystal molecules changes as shown in FIG. 4B. Here, it is described that a low potential is supplied to the first transparent electrode 130-1, the third transparent electrode 130-3, the fifth transparent electrode 130-5, and the seventh transparent electrode 130-7, and a high potential is supplied to the second transparent electrode 130-2, the fourth transparent electrode 130-4, the sixth transparent electrode 130-6, and the eighth transparent electrode 130-8. In addition, in FIG. 4B, for convenience, the low potential and the high potential are illustrated using symbols "−" and "+", respectively. Hereinafter, the electric field generated between adjacent transparent electrodes may be referred to as a lateral electric field.

As shown in FIG. 4B, the liquid crystal molecules on the side of the first substrate 120-1 are aligned as a whole in a convex arc shape along the x-axis direction with respect to the first substrate 120-1 due to the influence of the lateral electric field between the first transparent electrode 130-1 and the second transparent electrode 130-2. Similarly, the liquid crystal molecules on the side of the second substrate 120-2 are aligned as a whole in a convex arc shape along the y-axis direction with respect to the second substrate 120-2 due to the influence of the lateral electric field between the third transparent electrode 130-3 and the fourth transparent electrode 130-4. The alignment of the liquid crystal molecules located approximately in the center between the first transparent electrode 130-1 and the second transparent electrode 130-2 is hardly changed by any lateral electric field. Therefore, light incident on the first liquid crystal layer 160-1 is diffused in the x-axis direction according to the refractive index distribution of the liquid crystal molecules on the side of the first substrate 120-1 aligned in the convex arc shape along the x-axis direction, and then is diffused in the y-axis direction according to the refractive index distribution of the liquid crystal molecules on the side of the second substrate 120-2 aligned in the convex arc shape along the y-axis direction.

In addition, since the first substrate 120-1 and the second substrate 120-2 have a sufficiently large distance between the substrates, the lateral electric field between the first transparent electrode 130-1 and the second transparent electrode 130-2 of the first substrate 120-1 does not affect the alignment of the liquid crystal molecules on the second substrate 120-2, or is negligibly small. Similarly, the lateral electric field between the third transparent electrode 130-3 and the fourth transparent electrode 130-4 of the second substrate 120-2 does not affect the alignment of the liquid crystal molecules on the first substrate 120-1, or is negligibly small.

Since the alignment of the liquid crystal molecules in the second liquid crystal layer 160-2 in the case where potentials are supplied to the fifth transparent electrode 130-5 to the eighth transparent electrode 130-8 are also the same as the alignment of the liquid crystal molecules in the first liquid crystal layer 160-1, the description thereof is omitted here.

Next, the distribution of light passing through the optical element 10 is described. Light emitted from the light source has a polarization component in the x-axis direction (hereinafter, referred to as "P-polarization component") and a polarization component in the y-axis direction (hereinafter, referred to as "S-polarization component"). However, for convenience, the polarization component of the light is divided into the P-polarization component and the S-polarization component in the following description. That is, the light emitted from the light source (see (1) in FIGS. 4A and 4B) includes a first polarized light 310 having the P-polarization component and a second polarized light 320 having the S-polarization component. In addition, an arrow symbol and a circle symbol with a cross in FIGS. 4A and 4B represent the P-polarization component and the S-polarization component, respectively.

After the first polarized light 310 is incident on the first substrate 120-1, the polarization component of the first polarized light 310 changes from the P-polarization component to the S-polarization component according to the twist of the alignment of the liquid crystal molecules as the first polarized light 310 approaches the second substrate 120-2 (see (2) to (4) in FIGS. 4A and 4B). More specifically, although the first polarized light 310 has the polarization axis in the x-axis direction on the side of the first substrate 120-1, the polarization axis of the first polarized light 310 is gradually changed in the process of passing in the thickness direction of the first liquid crystal layer 160-1 and the first polarized light 310 has the S-polarization component on the side of the second substrate 120-2. Then, the first polarized light 310 is emitted from the second substrate 120-2 (see (5) in FIGS. 4A and 4B).

Here, when a lateral electric field is generated between the first transparent electrode 130-1 and the second transparent electrode 130-2, the liquid crystal molecules on the side of the first substrate 120-1 are arranged along the x-axis in the convex arc shape due to the influence of the lateral electric field and the refractive index distribution changes. Therefore, the first polarized light 310 is diffused in the x-axis direction according to the refractive index distribution of the liquid crystal molecules. Further, when a lateral electric field is generated between the third transparent electrode 130-3 and the fourth transparent electrode 130-4, the liquid crystal molecules on the side of the second substrate 120-2 are arranged along the y-axis direction in the convex arc shape due to the influence of the lateral electric field and the refractive index distribution changes. Therefore, the first polarized light 310 is diffused in the y-axis direction according to the change in the refractive index distribution of the liquid crystal molecules.

Therefore, when no lateral electric field is generated (see FIG. 3A), the polarization component of the first polarized light 310 transmitted through the first liquid crystal cell 110-1 changes from the P polarization component to the S polarization component. On the other hand, when the lateral electric field is generated (see FIG. 3B), the polarization component of the first polarized light 310 transmitted through the first liquid crystal cell 110-1 changes from the P polarization component to the S polarization component, and the first polarized light 310 is diffused in the x-axis direction and in the y-axis direction.

After the second polarized light 320 is incident on the first substrate 120-1, the polarization component of the second polarized light 320 changes from the S-polarization component to the P-polarization component according to the twist of the alignment of the liquid crystal molecules as the second polarized light 320 approaches the second substrate 120-2 (see (2) to (4) in FIGS. 4A and 4B). More specifically, although the second polarized light 320 has the polarization axis in the y-axis direction on the side of the first substrate 120-1, the polarization axis of the second polarized light 320 is gradually changed in the process of passing in the thickness direction of the first liquid crystal layer 160-1 and the second polarized light 320 has the P-polarization component on the side of the second substrate 120-2, and then, the second polarized light 320 is emitted from the second substrate 120-2 (see (5) in FIGS. 4A and 4B).

Here, when a lateral electric field is generated between the first transparent electrode 130-1 and the second transparent electrode 130-2, the liquid crystal molecules on the side of the first substrate 120-1 are arranged along the x-axis in the convex arc shape due to the influence of the lateral electric field and the refractive index distribution changes. However, since the polarization axis of the second polarized light 320 is orthogonal to the alignment of the liquid crystal molecules on the side of the first substrate 120-1 side, the second polarized light 320 is not affected by the refractive index distribution of the liquid crystal molecules and passes without being diffused. Further, when a lateral electric field is generated between the third transparent electrode 130-3 and the fourth transparent electrode 130-4, the liquid crystal molecules on the side of the second substrate 120-2 are arranged in the y-axis direction in the convex arc shape due to the influence of the transverse electric field and the refractive index distribution changes. However, since the polarization axis of the second polarized light 320 is orthogonal to the alignment of the liquid crystal molecules on the side of the second substrate 120-2, the second polarized light 320 is not affected by the refractive index distribution of the liquid crystal molecules and passes without being diffused.

Therefore, not only when no lateral electric field is generated (see FIG. 4A) but also when a lateral electric field is generated (see FIG. 4B), the polarization component of the second polarized light 320 transmitted through the first liquid crystal cell 110-1 changes from the S-polarization component to the P-polarization component but the second polarized light 320 is not diffused.

The liquid crystal molecules in the second liquid crystal layer 160-2 of the second liquid crystal cell 110-2 also have the same refractive index distribution as the liquid crystal molecules in the first liquid crystal layer 160-1 of the first liquid crystal cell 110-1. However, since the polarization axes of the first polarized light 310 and the second polarized light 320 change by transmission through the first liquid crystal cell 110-1, the polarized light affected by the refractive index distribution of the liquid crystal molecules in the second liquid crystal layer 160-2 is reversed. That is, not only when no lateral electric field is generated (see FIG. 4A) but also when a lateral electric field is generated (see FIG. 4B), the polarization component of the first polarized light 310 transmitted through the second liquid crystal cell 110-2 changes from the S-polarization component to the P-polarization component but the first polarized light 310 is not diffused (see (6) to (8) in FIGS. 4A and 4B). On the other hand, when no lateral electric field is generated (see FIG. 4A), the polarization component of the second polarized light 320 transmitted through the second liquid crystal cell 110-2 only changes from the P-polarization component to the S-polarization component. However, when a lateral electric field is generated (see FIG. 4B), the polarization component of the second polarized light 320 transmitted through the second liquid crystal cell 110-2 changes from the P-polarization component to the S-polarization component, and the second polarized light 320 is diffused in the x-axis direction and in the y-axis direction.

As can be seen from the above, in the optical element 10, by stacking the two liquid crystal cells 110, the polarization direction of the light incident on the optical element 10 changes twice. Thus, the same polarization direction of light before entering the optical element 10 and after being emitted from the optical element 10 can be maintained (see (1) and (9) in FIGS. 4A and 4B). On the other hand, when potentials are supplied to the transparent electrodes in the optical element 10, the refractive index distribution of the liquid crystal molecules in the liquid crystal layer 160 of the liquid crystal cell 110 can change and the transmitted light can be refracted. More specifically, the first liquid crystal cell 110 diffuses the light of the first polarized component 310 (P-polarization component) in the x-axis direction, the y-axis direction, or both the x-axis and y-axis directions, and the liquid crystal cell 120 diffuses the light of the second polarized component 320 (S-polarization component) in the x-axis direction, the y-axis direction, or both the x-axis and y-axis directions.

In FIGS. 4A and 4B, although only the first liquid crystal cell 110-1 and the second liquid crystal cell 110-2 are illustrated and the light distribution of the light transmitted through the first liquid crystal cell 110-1 and the second liquid crystal cell 110-2 is described, the same applies to the light distribution of light transmitted through the third liquid crystal cell 110-3 and the fourth liquid crystal cell 110-4. In the optical element 10, when the number of the stacked liquid crystal cells 110 is increased, the diffused light can be further diffused, and the shape of the light distribution can be greatly changed.

[4. Control of Supply of Potential to Transparent Electrode 130 of Optical Element 10]

Figure 5:
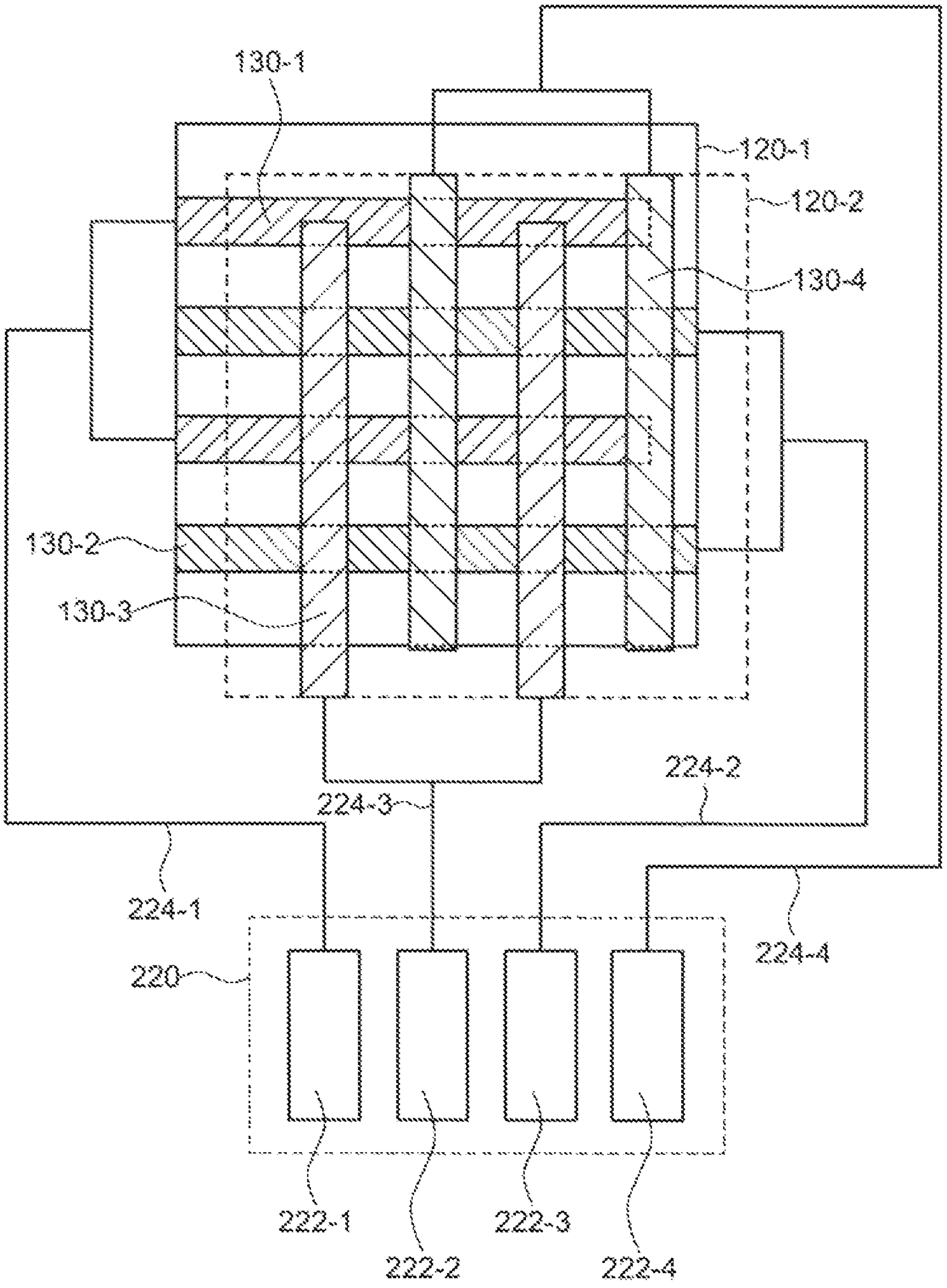
FIG. 5 is a schematic diagram illustrating connections between transparent electrodes of an optical element and a switch circuit part in an optical device according to an embodiment of the present invention.

FIG. 5 is a schematic diagram illustrating connections between the transparent electrodes 130 of the optical element 10 and the switch circuit part 220 in the optical device 1 according to an embodiment of the present invention. In addition, FIG. 5 shows only the first transparent electrode 130-1 to the fourth transparent electrode 130-4 of the first liquid crystal cell 110-1. Furthermore, in FIG. 5, the second substrate 120-2 is shown by a broken line for convenience of explanation.

The first transparent electrode 130-1, the second transparent electrode 130-2, the third transparent electrode 130-3, and the fourth transparent electrode 130-4 are electrically connected to a first potential signal line 224-1, a second potential signal line 224-2, a third potential signal line 224-3, and a fourth potential signal line 224-4, respectively. The switch circuit part 220 includes a first switch circuit 222-1, a second switch circuit 222-2, a third switch circuit 222-3, and a fourth switch circuit 222-4. The first switch circuit 222-1, the second switch circuit 222-2, the third switch circuit 222-3, and the fourth switch circuit 222-4 are electrically connected to the first potential signal line 224-1, the second potential signal line 224-2, the third potential signal line 224-3, and the fourth potential signal line 224-4, respectively. Therefore, a first potential signal controlled by the first switch circuit 222-1 is input to the first transparent electrode 130-1 via the first potential signal line 224-1. Similarly, a second potential signal controlled by the second switch circuit 222-2 is input to the second transparent electrode 130-2 via the second potential signal line 224-2, a third potential signal controlled by the third switch circuit 222-3 is input to the third transparent electrode 130-3 via the third potential signal line 224-3, and a fourth potential signal controlled by the fourth switch circuit 222-4 is input to the fourth transparent electrode 130-4 via the fourth potential signal line 224-4. In this way, in the first liquid crystal cell 110-1, the switch circuit 222 included in the switch circuit part 220 can independently supply a potential to each of the transparent electrodes 130. In addition, since the same configuration applies to the second liquid crystal cell 110-2 to the fourth liquid crystal cell 110-4, the description thereof is omitted here.

Figure 6:
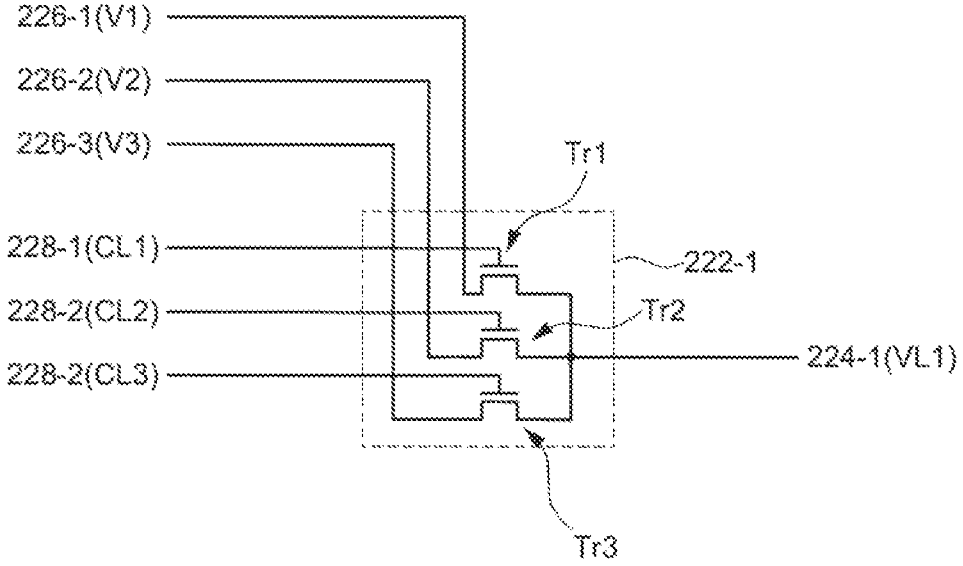
FIG. 6 is a circuit diagram showing a switch circuit included in a switch circuit part in an optical device according to an embodiment of the present invention.

FIG. 6 is a circuit diagram showing the switch circuit 222 included in the switch circuit part 220 in the optical device 1 according to an embodiment of the present invention. In addition, although only the first switch circuit 222-1 electrically connected to the first transparent electrode 130-1 is shown in FIG. 6, configurations of the second switch circuit 222-2 to the fourth switch circuit 222-4 are also similar to the configuration of the first switch circuit 222-1.

The first switch circuit 222-1 includes a first transistor Tr1, a second transistor Tr2, and a third transistor Tr3. In the first transistor Tr1, one of a source and a drain is electrically connected to a first power supply line 226-1 that supplies a first potential V1 from a first power source of the power supply part 210, and the other of the source and the drain is electrically connected to the first potential signal line 224-1. Further, a first control signal line 228-1 is electrically connected to a gate of the first transistor Tr1, and a first control signal CL1 generated by the control signal generation circuit part 230 is input to the gate of the first transistor Tr1. In a second transistor Tr2, one of a source and a drain is electrically connected to a second power supply line 226-2 that supplies a second potential V2 from the second power source of the power supply part 210, and the other of the source and the drain is electrically connected to the first potential signal line 224-1. Further, a second control signal line 228-2 is electrically connected to a gate of the second transistor Tr2, and a second control signal CL2 generated by the control signal generation circuit part 230 is input to the gate of the second transistor Tr2. In a third transistor Tr3, one of a source and a drain is electrically connected to a third power supply line 226-3 that supplies a third potential V3 from a third power source of the power supply part 210, and the other of the source and the drain is electrically connected to the first potential signal line 224-1. Further, a third control signal line 228-3 is electrically connected to a gate of the third transistor Tr3, and a third control signal CL3 generated by the control signal generation circuit part 230 is input to the gate of the third transistor Tr3.

In the first switch circuit 222-1, any one of the first potential V1, the second potential V2, and the third potential V3 is selected by the first control signal CL1, the second control signal CL2, and the third control signal CL3 to output the first potential signal VL1 including the selected potential to the first potential signal line 224-1. In addition, for convenience, the first potential V1, the second potential V2, and the third potential V3 may be described below as 30 V, 15 V, and 0 V, respectively. However, the potentials of the first potential V1, the second potential V2, and the third potential V3 are not limited thereto.

Figure 7A:
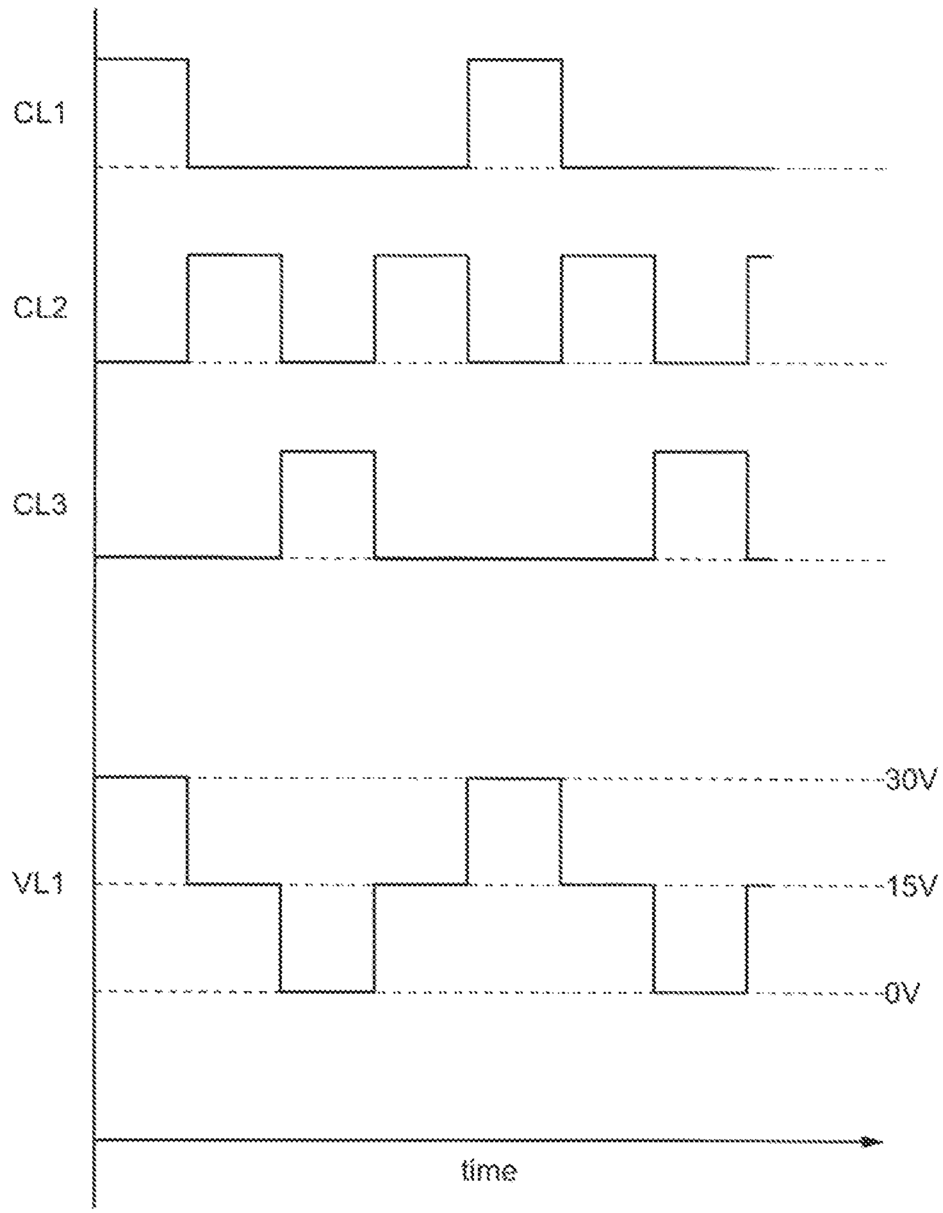
FIG. 7A is a timing chart illustrating a relationship between control signals input to a switch circuit part and a potential signal output from the switch circuit part in an optical device according to an embodiment of the present invention.
Figure 7B:
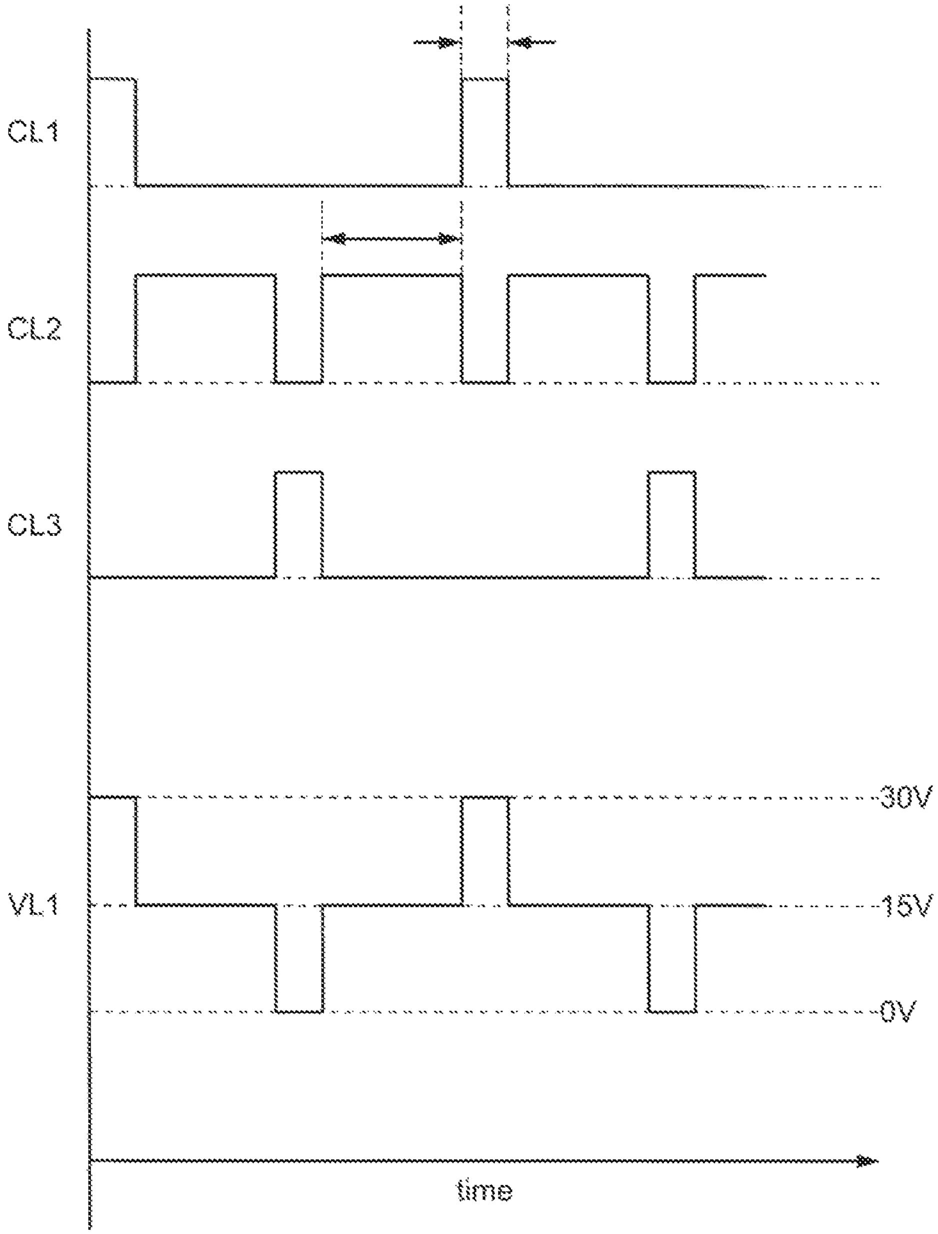
FIG. 7B is a timing chart illustrating a relationship between control signals input to a switch circuit part and a potential signal output from the switch circuit part in an optical device according to an embodiment of the present invention.

FIGS. 7A and 7B are timing charts illustrating a relationship between the control signals input to the switch circuit part 220 and the potential signal output from the switch circuit part 220 in the optical device 1 according to an embodiment of the present invention. In addition, only the first potential signal VL1 output to the first potential signal line 224-1 is shown in FIGS. 7A and 7B. However, since the potential signal VL2 output to the second potential line 224-2 is similar to the first potential signal VL1, the description thereof is omitted here.

As shown in FIG. 7A, when the first control signal CL1 is input to the switch circuit part 220, the first potential signal line 224-1 is supplied with the first potential V1 (30 V). Further, when input of the first control signal CL1 to the switch circuit unit 220 is stopped and the second control signal CL2 is input to the switch circuit unit 220, the first potential signal line 224-1 is supplied with the second potential V2 (15 V). Furthermore, when input of the second control signal CL2 to the switch circuit part 220 is stopped and the third control signal CL3 is input to the switch circuit part 220, the first potential signal line 224-1 is supplied with the third potential V3 (0 V). Therefore, the first potential signal VL1 is a signal including the first potential V1, the second potential V2, and the third potential V3, and the first transparent electrode 130 connected to the first potential signal line 224-1 is supplied with any one of the first potential V1, the second potential V2, and the third potential V3.

In addition, although the pulse widths of the first control signal CL1 to the third control signal CL3 are the same in FIG. 7A, the pulse widths of the first control signal CL1 to the third control signal CL3 may be different from each other as shown in FIG. 7B. Even in such a case, the first potential signal VL1 is a signal including the first potential V1, the second potential V2, and the third potential V3 based on the pulse widths of the first control signal CL1, the second control signal CL2, and the third control signal CL3, respectively.

Figure 8:
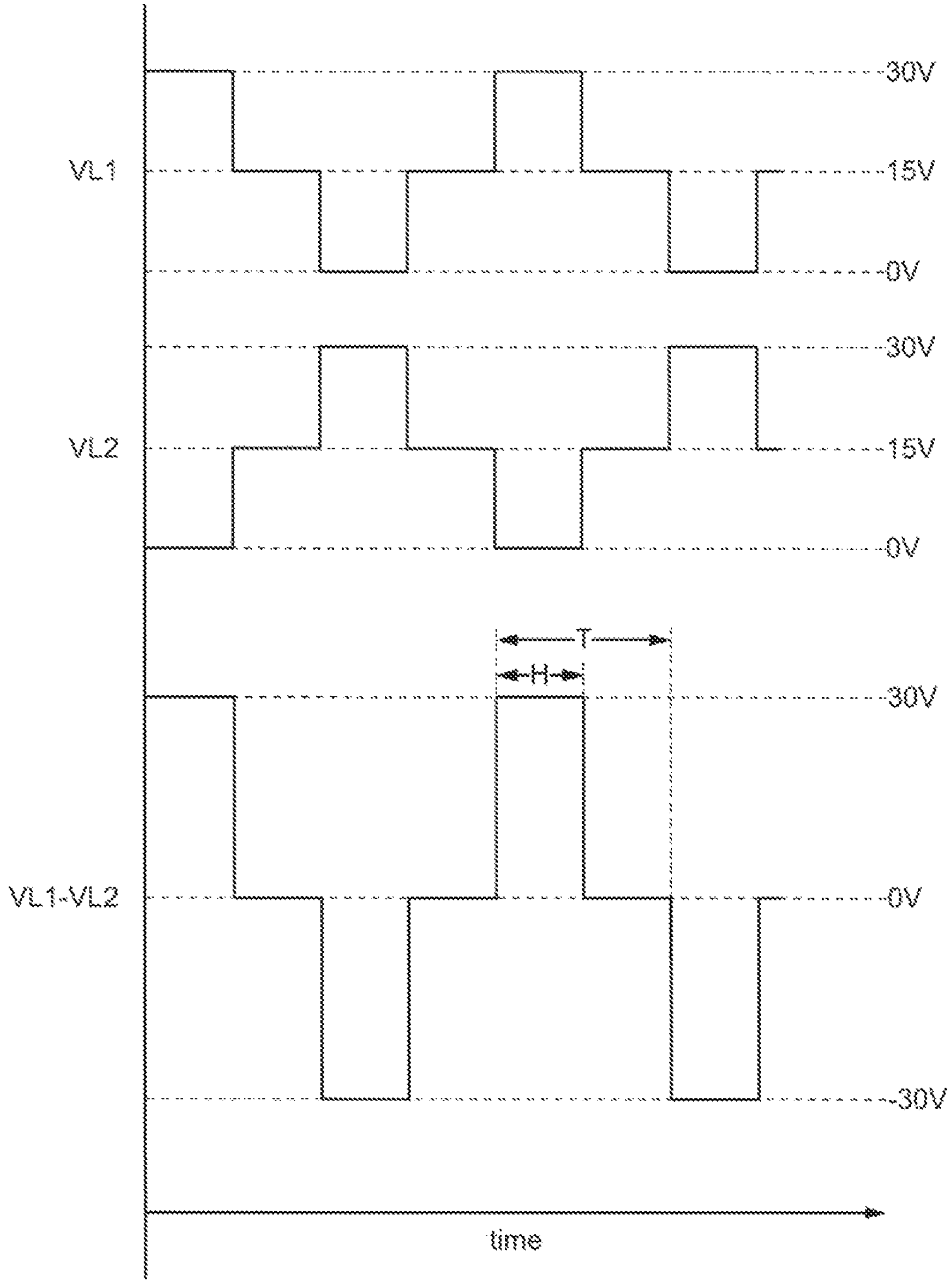
FIG. 8 is a timing chart showing a relationship between potential signals and a potential difference between transparent electrodes in an optical device according to an embodiment of the present invention.
Figure 9:
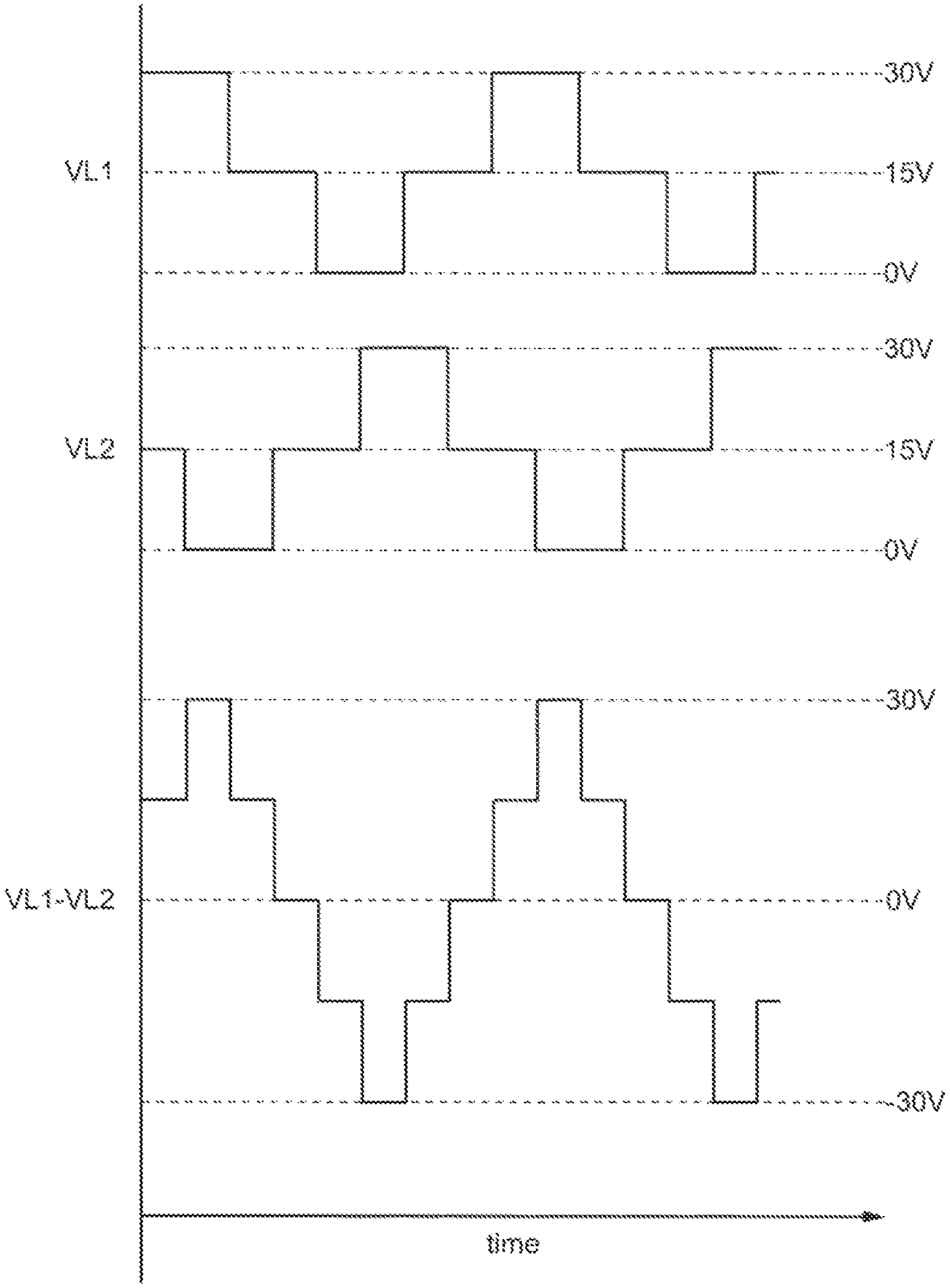
FIG. 9 is a timing chart showing a relationship between potential signals and a potential difference between transparent electrodes in an optical device according to an embodiment of the present invention.
Figure 10:
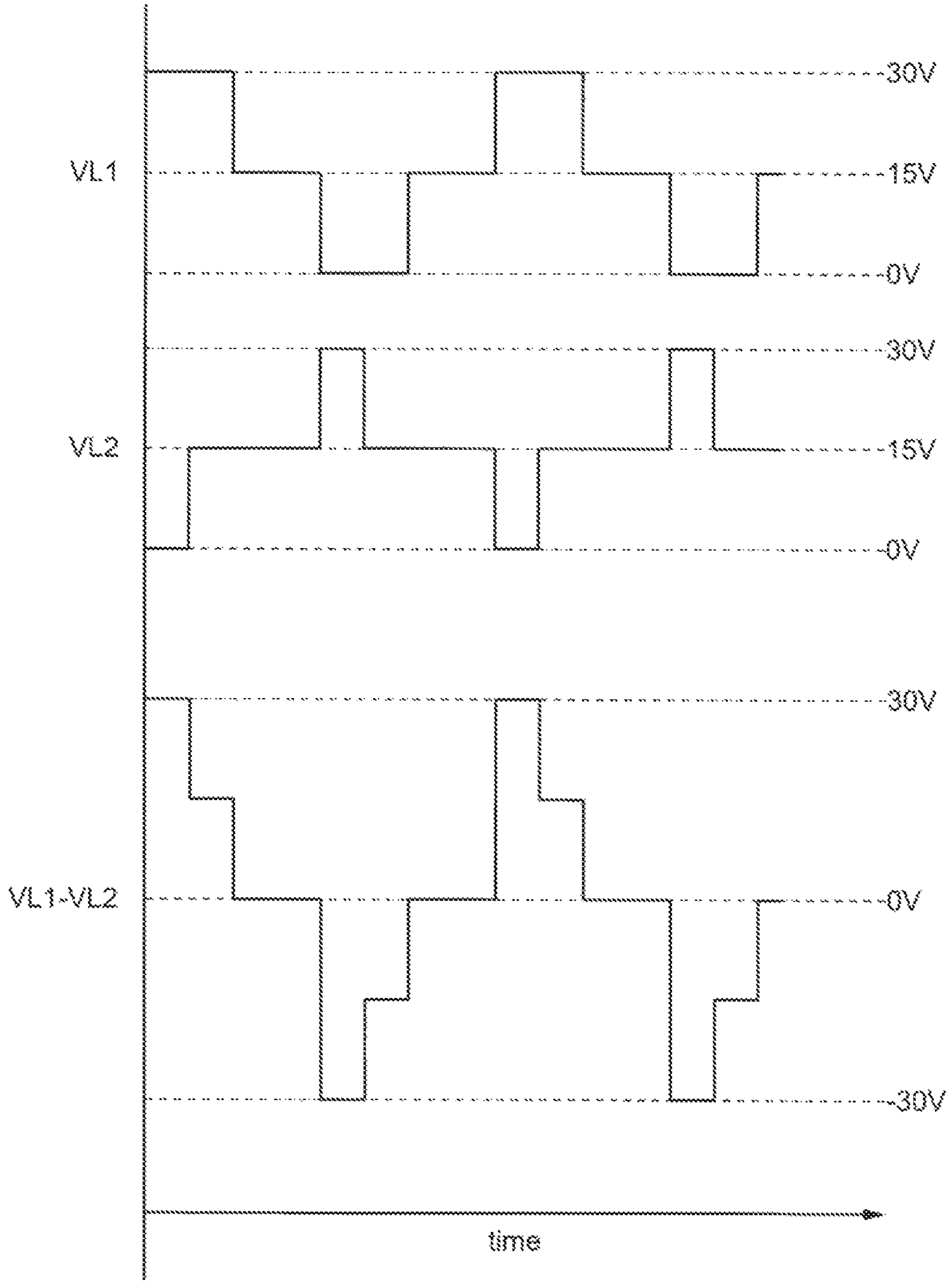
FIG. 10 is a timing chart showing a relationship between potential signals and a potential difference between transparent electrodes in an optical device according to an embodiment of the present invention.

FIGS. 8 to 10 are timing charts showing relationships between the potential signals and a potential difference between the transparent electrodes 130 in the optical device 1 according to an embodiment of the present invention. In addition, FIGS. 8 to 10 show the first potential signal VL1 input to the first transparent electrode 130-1, the second potential signal VL2 input to the second transparent electrode 130-2, and the potential difference VL1-VL2 between the first transparent electrode 130-1 and the second transparent electrode 130-2.

In FIG. 8, the first potential signal VL1 is a signal in which potentials of +30 V, +15 V, 0V, and +15 V are sequentially supplied to the first transparent electrode 130-1. Further, the second potential signal VL2 is a signal in which potentials of 0 V, +15 V, +30 V, and +15 V are sequentially supplied to the second transparent electrode 130-2. The first potential signal VL1 and the second potential signal VL2 have the same pulse width and are inverted in phase. Therefore, the potential difference (VL1−VL2) of +30 V, 0 V, −30 V, and 0V is generated between the first transparent electrode 130-1 and the second transparent electrode 130-2. In this case, when the potential difference is +30 V and −30 V, the alignment state of the liquid crystal molecules in the first liquid crystal layer 160-1 changes, and the light passing through the first liquid crystal cell 110-1 can be diffused. Therefore, in the optical device 1, the light distribution can be controlled by the potential difference between the transparent electrodes 130 having the pulse width H with respect to the period T (since the alignment states of the liquid crystal molecules based on the potential differences of +30 V and −30 V are the same, the unit of repetition of |VL1−VL2| is defined as one period here).

The third transparent electrode 130-3 and the fourth transparent electrode 130-4 are also similar to the first transparent electrode 130-1 and the second transparent electrode 130-2. Further, the second liquid crystal cell 110-2, the third liquid crystal cell 110-3, and the fourth liquid crystal cell 110-4 are also similar to the first liquid crystal cell 110-1.

The first potential signal VL1 and the second potential signal VL2 may be out of phase. This is described with reference to FIG. 9.

In FIG. 9, the first potential signal VL1 is a signal in which potentials of +30 V, +15 V, 0V, and +15 V are sequentially supplied to the first transparent electrode 130-1. Further, the second potential signal VL2 is a signal in which potentials of 0 V, +15 V, +30 V, and +15 V are sequentially supplied to the second transparent electrode 130-2. However, the phase of the second potential signal VL2 is different from the phase of the first potential signal VL1. Specifically, the second potential signal VL2 is out of phase with the first potential signal VL1 by +45 degrees ($\pi/4$). More specifically, the second potential signal VL2 has a reverse phase with respect to the first potential signal VL1, and is further delayed by π/4. Thus, in the present embodiment, the second potential signal VL2 has a phase other than the inversion of the phase of the first potential signal VL1. Therefore, the potential differences of +15 V, +30 V, +15 V, 0 V, −15 V, −30 V, −15 V, and 0 V are generated between the first transparent electrode 130-1 and the second transparent electrode 130-2. In this case, when the potential difference is +15 V, +30 V, −15 V, and −30 V, the alignment state of the liquid crystal molecules in the first liquid crystal layer 160-1 changes, and the light passing through the first liquid crystal cell 110-1 can be diffused. In the timing chart shown in FIG. 9, the light distribution can be controlled by the potential difference between the transparent electrodes 130, which is generated by combining the first potential signal VL1 and the second potential signal VL2 and has a pulse width different from the pulse widths of the first potential signal VL1 or the second potential signal VL2.

The first potential signal VL1 and the second potential signal VL2 do not require having the same pulse width. This is described with reference to FIG. 10.

In FIG. 10, the first potential signal VL1 is a signal in which potentials of +30 V, +15 V, 0 V, and +15 V are sequentially supplied to the first transparent electrode 130-1. Further, the second potential signal VL2 is a signal in which potentials of 0 V, +15 V, +30 V, and +15 V are sequentially supplied to the second transparent electrode 130-2. However, the pulse width of the second potential signal VL2 is different from the pulse width of the first potential signal. More specifically, although the first potential signal VL1 and the second potential signal VL2 have mutually inverted phases, the pulse width of the second potential signal VL2 is half the pulse width of the first potential signal VL1. Thus, there is a section of time when the second potential signal VL2 has an intermediate potential even though the first potential signal VL1 is oscillated with the pulse width. Therefore, the potential difference (VL1−VL2) of +30 V, +15 V, 0 V, −30 V, −15 V, and 0 V is generated between the first transparent electrode 130-1 and the second transparent electrode 130-2. In this case, when the potential difference is +15 V, +30 V, −15 V, and −30 V, the alignment state of the liquid crystal molecules in the first liquid crystal layer 160-1 changes, and the light passing through the first liquid crystal cell 110-1 can be diffused. Also, in the timing chart shown in FIG. 10, the light distribution can be controlled by the potential difference between the transparent electrodes 130, which has a pulse width different from the pulse width of the first potential signal VL1 or the second potential signal VL2.

As described above, in the optical device 1, the light distribution can be controlled by so-called pulse width modulation (PWM) driving in which various pulse widths and duty ratios (for example, the pulse width H with respect to the period T shown in FIG. 8) by changing the pulse width or phase of the potential signal input to the transparent electrode 130. In addition, the pulse width or the duty ratio of the potential difference between the transparent electrodes 130 may be changed by changing the pulse widths of the first control signal CL1, the second control signal CL2, and the third control signal CL3.

As described above, in the optical device 1, the potential to be supplied to the optical element 10 can be selected using only a so-called analog switch, and the optical element 10 can be controlled by PWM driving. That is, the optical device 1 does not require expensive elements such as a DAC or AMP. Therefore, the optical device 1 can be manufactured at low cost, and manufacturing costs can be suppressed.

Examples

Figure 11:
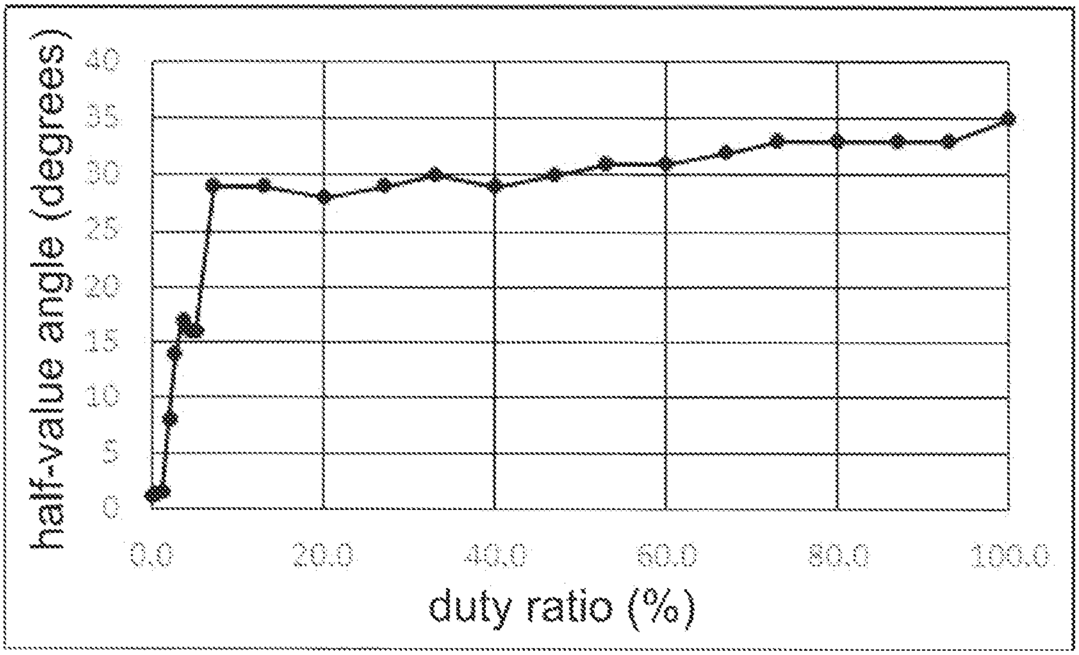
FIG. 11 is a graph showing a light distribution state using an optical device according to an embodiment of the present invention.

FIG. 11 is a graph showing a light distribution state using the optical device 1 according to an embodiment of the present invention. The horizontal axis of the graph shown in FIG. 11 is the duty ratio (%), and the vertical axis is the half-value angle (degrees). Further, the half-value angle is an angle at which the brightness is 50% of the brightness at the front (0 degrees) of the optical device 1 in an angle-dependent measurement of brightness. That is, a larger half-value angle means that the light is more diffused.

The manufactured optical device 1 has four liquid crystal cells 110 in the optical element 10, the width of the transparent electrode 130 of each liquid crystal cell 110 is 8 μm, and the distance between the transparent electrodes 130 is 8 μm. Further, the period T of the potential signal input to each transparent electrode 130 is 60 Hz.

As shown in FIG. 11, as the duty ratio increases, the half-value angle also increases. That is, it is understood that the optical device 1 greatly diffuses light. In particular, it is understood that the diffusion is large when the duty ratio exceeds 10%.

Within the scope of the present invention, those skilled in the art may conceive of examples of changes and modifications, and it is understood that these examples of changes and modifications are also included within the scope of the present invention. For example, additions, deletions, or design changes of constituent elements, or additions, omissions, or changes to conditions of steps as appropriate based on the respective embodiments described above are also included within the scope of the present invention as long as the gist of the present invention is provided.

Further, other effects which differ from those brought about by the embodiment, but which are apparent from the description herein or which can be readily predicted by those skilled in the art, are naturally understood to be brought about by the present invention.

What is claimed is:

1. An optical device comprising:

an optical element comprising at least one liquid crystal cell configured to distribute light emitted from a light source;

a power supply part configured to generate a first potential and a second potential different from the first potential;

a control signal generation circuit part configured to generate a first control signal, a second control signal, a third control signal, and a fourth control signal, each of the first control signal, the second control signal, the third control signal, and the fourth control signal controlling a first pulse width of the first potential and a second pulse width of the second potential; and a switch circuit part configured to output a first potential signal including the first potential with the first pulse width and the second potential with the second pulse width based on the first control signal, wherein the at least one liquid crystal cell comprises:

a first substrate on which a first transparent electrode and a second transparent electrode are alternately arranged in a first direction, and a second substrate on which a third transparent electrode and a fourth transparent electrode are alternately arranged in a second direction intersecting the first direction, the power supply part comprises a first power source generating the first potential and a second power source generating the second potential, the switch circuit part comprises a first switch outputting the first potential signal, a second switch circuit outputting a second potential signal based on the second control signal, a third switch circuit outputting a third potential signal based on the third control signal, and a fourth switch circuit outputting a fourth potential signal based on the fourth control signal, each of the first switch circuit, the second switch circuit, the third switch circuit, and the fourth switch circuit electrically connected to the first power source and the second power source, the first transparent electrode, the second transparent electrode, the third transparent electrode, and the fourth transparent electrode are electrically connected to the first switch circuit, the second switch circuit, the third switch circuit, and the fourth switch circuit, respectively, and the first potential signal, the second potential signal, the third potential signal, and the fourth potential signal are input to the first transparent electrode, the second transparent electrode, the third transparent electrode, and the fourth transparent electrode, respectively.

2. The optical device according to claim 1, wherein the second pulse width is different from the first pulse width.

3. The optical device according to claim 1, wherein a first phase of the first potential signal is different from a second phase of the second potential signal.

4. The optical device according to claim 3, wherein the second phase is an inverted phase of the first phase.

5. The optical device according to claim 1, wherein the at least one liquid crystal cell comprises four liquid crystal cells.

6. The optical device according to claim 1, wherein the power supply part further comprises a third power source generating a third potential, each of the first control signal, the second control signal, the third control signal, and the fourth control signal further controls a third pulse width of the third potential, and each of the first switch circuit, the second switch circuit, the third switch circuit, and the fourth switch circuit is electrically connected to the third power source.

7. The optical device according to claim 1, wherein a phase of the first potential signal is an inverted phase of the second potential signal, and wherein a phase of the third potential signal is an inverted phase of the fourth potential signal.

8. The optical device according to claim 1, wherein a pulse width due to a difference between the first potential signal and the second potential signal has a duty ratio exceeding 10%.

9. The optical device according to claim 1, wherein a first potential is twice the second potential.

* * * * *